June 24, 1941. H. Q. ABELL 2,246,491
RULING INSTRUMENT
Filed Dec. 22, 1939
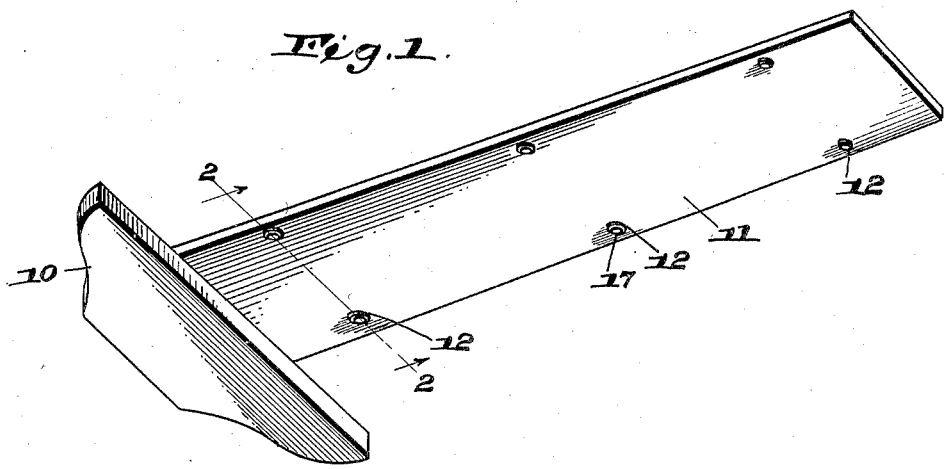
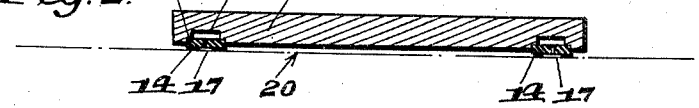
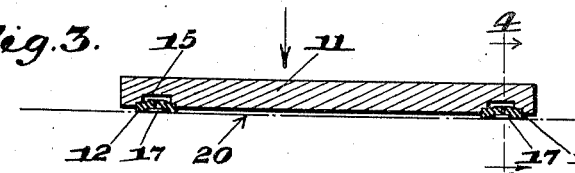
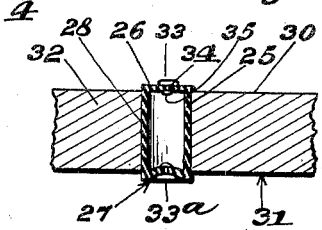
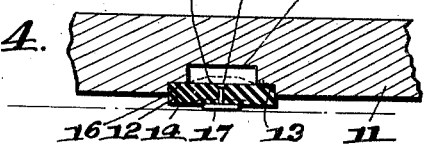
Inventor
H. Q. Abell
By Munn, Anderson, & Liddy
Attorneys Patented June 24, 1941

2,246,491

UNITED STATES PATENT OFFICE 2,246,491

RULING INSTRUMENT

Harold Q. Abell, Stockdale, Kans.

Application December 22, 1939, Serial No. 310,636

2 Claims. (Cl. 33—107)

This invention relates to a device for preventing slippage of an instrument over a smooth surface.

An object of the invention is the provision of a device adapted to be attached or embodied in an instrument such as a T square, triangle, ruler or any other instrument which is adapted to be used on a smooth surface to prevent slippage of the instrument when a sufficient pressure is applied thereto but which will permit sliding of the instrument for positioning the same.

Another object of the invention is the provision of a device which is adapted to be incorporated in those types of instruments which are adapted to be used for drawing purposes, the device including means to permit the instrument to slide readily over a polished surface when no pressure is employed but which will prevent slippage of the instrument on the surface when the usual pressure is applied to the instrument during drawing, the device including means for frictionally engaging the surface to prevent slippage in cooperation with a non-frictional means which will permit the instrument to slide.

A further object of the invention is the provision of a device which is adapted to be incorporated in an instrument used for drawing purposes, the device including an elastic member such as rubber or other suitable material which will engage frictionally a surface and prevent slippage of the instrument, a highly polished element carried by the elastic member being adapted to engage the surface to which the instrument is applied to permit ready movement of the instrument over said surface but being movable inwardly from the outer face of the elastic member when pressure is applied to the instrument so that the elastic member will engage the surface and prevent slippage.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in perspective of a T square showing my invention applied thereto, Figure 2 is a transverse section taken along the line 2—2 of Figure 1, Figure 3 is a section similar to Figure 2 showing the member which permits sliding of the instrument over a smooth surface being pressed inwardly from the outer surface of an elastic member, Figure 4 is an enlarged vertical section taken along the line 4—4, Figure 5 is an enlarged view in perspective of one of the inserts shown in Figs. 1 to 4, inclusive, and Figure 6 is an enlarged view in section showing a modified form of the insert.

Referring more particularly to the drawing, 10 designates the head of a T square while 11 designates the elongated member which is used for ruling purposes. While I have shown a T square for illustrating the application of my invention to an instrument, it will be appreciated that the device may be employed in connection with rulers, triangles or other drawing instruments.

Referring more particularly to Figure 4 it will be seen that an insert 12 in the form of a disc is seated within a pocket 13 formed in one face of the arm 11 of the T square.

It will be noted that the pocket has a depth which is less than the thickness of the disc 12 so that the outer face 14 of the disc extends beyond the adjacent face of the arm 11.

The disc is formed of rubber or any other suitable material which will make frictional contact with a smooth surface upon which the instrument is applied so that the instrument will be held against slippage during the drawing operation. From an inspection of Fig. 1 a number of these discs are employed at spaced points in order to provide a sufficient frictional surface to prevent slippage of the instrument.

Inwardly of the pockets is provided a second pocket 15 which has less diameter than the pocket 13 so that a shoulder 16 is provided upon which the disc 12 is seated. The disc may be secured in any approved manner to the walls of the pocket to prevent displacement of the disc.

A metal member has a head 17 located at the outer surface of the disc 12 and this metal member is provided with a shank 18 which passes axially through the disc and is provided with a flanged end 19 at the inner face of the disc for maintaining the head 17 in position. The outer face of the head is highly polished and may be made of metal or some composition material which will not have a frictional resistance with a surface such as a sheet of paper so that the instrument may be moved along the surface of the paper until it is decided to establish the position of the instrument for drawing purposes.

Referring more particularly to Figure 2 it will be seen that the heads 17 are in flat contact with a surface when no pressure is applied to the arm 11. At this time the surface 14 of the disc 12 is out of contact with the surface.

As soon as the instrument is placed in position and pressure is exerted upon the arm 11, as indicated by the arrow in Fig. 3, the heads 17 will be pressed inwardly as will be the inner portion of the disc 12 whereby the outer surface of the head will be flush with the outer periphery of the disc 12 so that a greater area of the outer face of the disc 12 will be in contact with the surface 20 to which the instrument has been applied and the frictional resistance of such portion of the disc 12 will prevent slippage of the arm and maintain it in position. When pressure is exerted on the head 17 the intermediate portion of the disc at the inner face will be depressed within the pocket 15.

In the form shown in Fig. 6 the elastic member 25 is disclosed as a cylinder having its opposite ends, respectively 26 and 27, closed. This cylinder is received within a cylindrical opening 28 and frictionally held therein. If desired, a cement may be employed for sinking the member 25 in position so that the opposite closed ends of the cylinder will project slightly beyond the outer surfaces 30 and 31 of the instrument 32. A head 33 is located outwardly of each closed end 26 or 27 and has its outer surface highly polished so that it will permit the instrument to be spread along a surface. A shank 34 and a flanged inner end 33 maintain the heads 33 or 33a in position.

When pressure is exerted on the outer face of the instrument the head 33a, as shown in Figure 6, will be pressed inwardly until the outer surface is flush with the outer surface of the closed end 27 so that a great portion of the closed end of the elastic member, which may be rubber or of some suitable composition, will engage the surface worked upon and prevent slippage of the instrument during a drawing operation.

The form shown in Figure 6 may be employed in those types of instruments in which either face may be used. Thus the opposite ends of the cylinder 25 and the heads 33 and 33a will, respectively, prevent slippage of the instrument or permit slippage when pressure has not been applied to the instrument.

While I have shown the heads of the gliders 17, 33 and 33a as having a shank and a flange for securing the heads in position, it will be appreciated that these heads may be cemented or secured in any approved manner to the outer face of the rubber seats 12, 26 or 27. In fact, the highly polished gliders may be vulcanized within the center of the projecting portions of the members 12, 26 and 27.

In the form shown in Figure 6 the hollow space within the member 25 provides an interior pocket for the inward movement of the members 26 and 33 or 27 and 33a and this is similar to the operation of the pocket 15 in Figs. 1 to 4, inclusive.

When pressure has been released on the instrument the resilient material of the disc 12 or the members 26 and 27 will again force the respective attached heads outwardly.

Where a flexible material is employed instead of the elastic material, a spring may be located within the pocket 15 or within the space enclosed by the member 25 for pressing outwardly against the associated parts for normally maintaining the gliders in operative positions so that the instrument may be readily moved along the surface.

I claim:

1. In a drawing instrument, a device for controlling the position of said instrument on smooth surfaces comprising a disk formed of elastic material which will frictionally engage said surface and prevent slippage of the instrument, a second disk formed of hard material and provided with a polished outer face of less diameter than the first disk, the second disk projecting beyond the outer face of the first disk and normally engaging the surface so that the instrument will readily slide on said surface, means securing the second disk to the outer face of the first disk, the second disk movable inwardly when pressure is applied to the instrument so that the disk will be imbedded in the first disk and permit the first disk to frictionally engage the surface, the first disk resiliently supporting the second disk.

2. A drawing instrument having openings through the body thereof, a device received by the openings for controlling the position of said instrument on smooth surfaces comprising a cylinder having the opposite ends closed, formed of elastic material and projecting beyond the opposite faces of the instrument, a disk, each, secured to the outer face of the opposite ends and of less diameter than said ends, the exposed faces of the disks being highly polished so that when said faces are applied to the surface the instrument may be readily slid thereon, the disks when pressure is applied to the instrument being forced inwardly and imbedded in the ends so that the surrounding portions of the ends of the cylinder will come into frictional contact with the surface and prevent sliding of said instrument.

HAROLD Q. ABELL.